United States Patent [19]
Kondo et al.

[11] Patent Number: 4,693,358
[45] Date of Patent: Sep. 15, 1987

[54] VEHICLE BODY CONVEYANCE IN ASSEMBLY LINE

[75] Inventors: Tetsuro Kondo; Tsuyoshi Ueda, both of Hiroshima, Japan

[73] Assignee: Mazda Motor Corporation, Hiroshima, Japan

[21] Appl. No.: 835,943

[22] Filed: Mar. 4, 1986

[30] Foreign Application Priority Data

Mar. 6, 1985 [JP] Japan .................................. 60-45097

[51] Int. Cl.$^4$ ............................................. B21B 39/14
[52] U.S. Cl. ................................ 198/339.1; 198/341; 901/7; 29/430; 29/559; 29/824
[58] Field of Search .................. 198/468.6, 345, 346.1, 198/346.2, 346.3, 341, 339.1; 901/7; 29/429, 430, 559, 822, 823, 824

[56] References Cited
U.S. PATENT DOCUMENTS

| | | | |
|---|---|---|---|
| 2,227,145 | 12/1940 | Lex et al. | 198/345 |
| 3,958,682 | 5/1976 | Martin | 198/341 |
| 4,086,522 | 4/1978 | Engelberger et al. | 198/341 X |
| 4,305,495 | 12/1981 | Zinke et al. | 198/346.3 X |
| 4,453,383 | 6/1984 | Leddet | 198/341 X |
| 4,589,184 | 5/1986 | Asano et al. | 901/7 X |
| 4,589,199 | 5/1986 | Ohtaki et al. | 901/7 X |

FOREIGN PATENT DOCUMENTS 52-34480 3/1977 Japan.

Primary Examiner—Dave W. Arola
Attorney, Agent, or Firm—Burns, Doane, Swecker & Mathis

[57] ABSTRACT

A conveyor system in an automobile assembly line which comprises a slat conveyor for conveying a vehicle body structure past a door fitting position at which at least one door assembly is fitted to the body structure being conveyed, and having at least one engagement member movable together therewith, a pair of side carriages arranged on respective sides of the slat conveyor for movement between initial and end positions along the slat conveyor, and a cylinder for forcibly returning the carriages, once moved to the end position to the accompaniment of the movement of the slat conveyor, to the initial position. Each of the carriages includes a plurality of lift cylinders operable to lift the body structure a predetermined height above the slat conveyor during the passage of the body structure being conveyed through the door fitting station.

5 Claims, 4 Drawing Figures

VEHICLE BODY CONVEYANCE IN ASSEMBLY LINE

BACKGROUND OF THE INVENTION

The present invention generally relates to a vehicle body conveyance in an assembly line and, more particularly, to a conveyor assembly that extends through a door fitting station.

As is well known to those skilled in the art, an automobile assembly line includes a number of work stations at which different assembling operations are generally simultaneously performed to automobile body structures being successively conveyed. Among the other work stations, these work stations include a door fitting station where door assemblies are fitted from both sides to an automobile body structure being moved on a conveyor. The conveyor that extends through the door fitting station is generally employed in the form of a so-called slat conveyor similar in appearance to a caterpillar or crawler track. Briefly speaking, the slat conveyor comprises a belt of slats articulately connected together in side-by-side relationship with respect to each other and driven to travel from one place to another and then back to the one place. In any event, the structure and the operation of the slat conveyor are well known in the art.

When it comes to an automatic door fitting, Japanese Laid-open Patent Publication No. 52-34480, published Mar. 16, 1977, discloses the installation of an accompanying carriage on both sides of a vehicle body transporting conveyor at the door fitting station, and a hydraulically driven door fitting assembly operatively mounted on the carriage. The door fitting assembly on each side of the conveyor includes a cylinder for driving an arm between retracted and fitting positions in a direction perpendicular to the direction of run of the conveyor, one end of the arm remote from the cylinder having a hingedly supported suction cup assembly for the support of a door assembly to be fitted to the automobile body structure. The carriage has a motor-driven, telescopically movable connecting rod adapted to engage a portion of the automobile body structure when the latter being conveyed is brought to a predetermined position, so that the carriage can be pulled forward to the accompaniment of the forward run of the automobile body structure. During the movement of the carriage accompanying the automobile body structure, the cylinder is actuated to fit the door assembly to the body structure in a manner controlled by a remote control unit, and accordingly, what the attendant worker or workers have to do at the door fitting station is to install hinge pins to connect the door assembly hingedly with the body structure.

The connecting rod is held in a retracted position when and so long as the body structure has not yet been brought to the predetermined position.

The conveyor used in this publication is described as a floor conveyor, and no other details thereof are disclosed therein because of the nature of the invention directed essentially to the automatic door fitting system.

When the automatic door fitting system such as disclosed in, for example, the above mentioned publication is employed in the automobile assembly line, the most important problem is how to exactly align the door assembly to be fitted with an associated door fitting opening in the body structure. While this exact alignment is considered relatively easy to achieve where the body structure is of a self-supporting or unitized type because the self-supporting or unitized body structure although having no conventional framework such as a chassis is reinforced in itself, the body structure of a type that requires the use of the conventional framework, such as a chassis-mounted vehicle body, for example, a cab structure for a truck or tractor, is susceptible to the misalignment because of the reason which will now be described with particular reference to FIG. 1 of the accompanying drawings.

In FIG. 1, the cab structure A for, for example, a truck is shown as mounted on the slat conveyor B through leading and trailing pairs of shim members C, the leading pair of the shim members C being positioned between the rearmost portion of the cab structure A and the slat conveyor B whereas the trailing pair of the shim members C are positioned between the foremost portion of the cab structure A and the slat conveyor B with the leading and trailing pairs of the shim members spaced a substantial distance from each other. Because of the reason described hereinbefore, the cab structure A has a smaller rigidity than the self-supporting or unitized body structure and, therefore, during the transportation on the assembly line while mounted on the slat conveyor B as shown, an intermediate portion of the cab structure A between the rearmost and foremost portions thereof tends to droop under its own weight as shown by the phantom line. As a matter of course, once this drooping occurs, the shape of the door fitting opening on each side of the cab structure is deformed to such an extent as to deviate from the mating shape of the door assembly to be fitted thereto and, therefore, the hinge brackets rigid or integral with the door assembly may fail to align with associated hinge members A' rigid with a respective front side pillar of the cab structure A and with which the hinge brackets are to be connected by means of respective hinge pins.

Considering that the installation of the hinge pins is performed while the door assembly is in an opened position relative to the cab structure A, the hinge brackets rigid or integral with the door assembly may be successfully connected with the respective hinge members even though the door assembly as a whole does not exactly align with the door fitting opening. However, where the hinge brackets are connected with the hinge members in this way, and when the cab structure with the door assemblies installed thereon is subsequently mounted on a chassis at the subsequent work station with the drooping phenomenon consequently removed, the door assemblies will require a readjustment to permit them to be selectively opened and closed smoothly relative to the cab structure A.

SUMMARY OF THE INVENTION

Accordingly, the present invention has for its essential object to provide an improved slat conveyor system effective to avoid the drooping phenomenon of a vehicle body structure during the transportation thereof through the door fitting station thereby to minimize or substantially eliminate the misalignment of the door assembly relative to the vehicle body structure being moved therethrough.

Another important object of the present invention is to provide an improved slat conveyor system of the type referred to above which substantially obviates the necessity of the subsequent readjustment of the door assembly because the vehicle body structure being conveyed through the door fitting station is uniformly supported above the slat conveyor with no possibility of body deformation such as drooping.

In order to accomplish the above described objects, the present invention provides the slat conveyor with a generally elongated carriage positioned on each side of the slat conveyor for movement between initial and end positions in a direction parallel to the direction of run of the slat conveyor and to the accompaniment of the movement of the vehicle body structure being conveyed. While the slat conveyor has, in addition to at least leading and trailing shim members for the support thereon of each vehicle body structure, at least one engagement member secured thereto for each vehicle body structure, a catch mechanism is mounted on each side carriage and includes a catch bar supported for movement between a disengaged position, at which the catch bar is clear from the path of movement of any one of the engagement members on the slat conveyor, and an engaged position at which any one of the engagement members can be caught by the catch bar for transmitting the movement of the slat conveyor to the respective carriage to move the latter from the initial position towards the end position in unison with the movement of the slat conveyor and, hence, that of the vehicle body structure being conveyed.

Each of the side carriages on the respective side of the slat conveyor also has at least two spaced lift cylinders mounted thereon at a leading end thereof and a substantially intermediate portion thereof between the leading and trailing ends, respectively, and adapted to be activated in response to or shortly after the start of movement of the respective side carriage from the initial position towards the end position for lifting the vehicle body structure a predetermined height above the slat conveyor. The actual door fitting job may be performed while the vehicle body structure is so lifted. The lowering of the vehicle body structure to allow the rearmost and foremost portions of the vehicle body structure to rest on the leading and trailing shim members takes place after the door assemblies have been completely fitted, i.e., after the passage of the vehicle body structure past the door fitting station and shortly before the arrival of the side carriages at the end positions. The lowering of the vehicle body structure is followed by the return movement of the respective catch bar from the engaged position to the disengaged position, thereby allowing the slat conveyor to run forwards and, on the other hand, the respective side carriage to return to the initial position in readiness for the next cycle of lifting of the succeeding vehicle body structure.

Since the lift cylinders on each of the side carriages are so spaced from each other, and the predetermined height over which each vehicle body structure can be lifted thereby is so selected, that a substantially intermediate portion of the respective vehicle body structure does not droop under its own weigh and can be supported in a position as if it were already mounted on a chassis structure, the door assembly to be fitted at the door fitting station can be exactly aligned with the door fitting opening on each side of the vehicle body structure and, therefore, the necessity of the post-fitting readjustment can be advantageously minimized.

BRIEF DESCRIPTION OF THE DRAWINGS

These and other objects and features of the present invention will become clear from the following description taken in conjunction with a preferred embodiment of the present invention with reference to the accompanying drawings, in which:

FIG. 3 is a cross-sectional view taken along the line III—III in FIG. 2; and

FIG. 4 is a top plan view of a portion of the slat conveyor system shown in FIG. 2.

DETAILED DESCRIPTION OF THE EMBODIMENT

Figure 1:
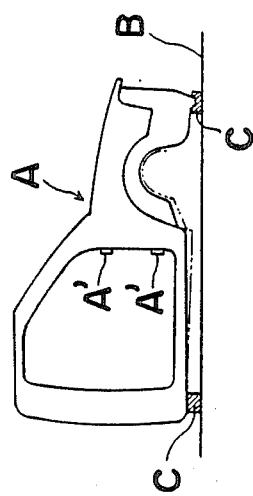
FIG. 1 is a fragmentary side view of the prior art slat conveyor showing the vehicle body structure drooping at a substantially intermediate portion.

Before the description of the present invention proceeds, it is to be noted that like parts are designated by like reference numerals throughout the accompanying drawings. It is also to be noted that the terms "leading" and "trailing" are employed in relation to the direction of forward run of the salt conveyor from a loading station at which similar vehicle body structures, for example, similar cab structures, are successively mounted on the slat conveyor in equally spaced relationship with each other for the subsequent passage through the door fitting station.

Figure 2:
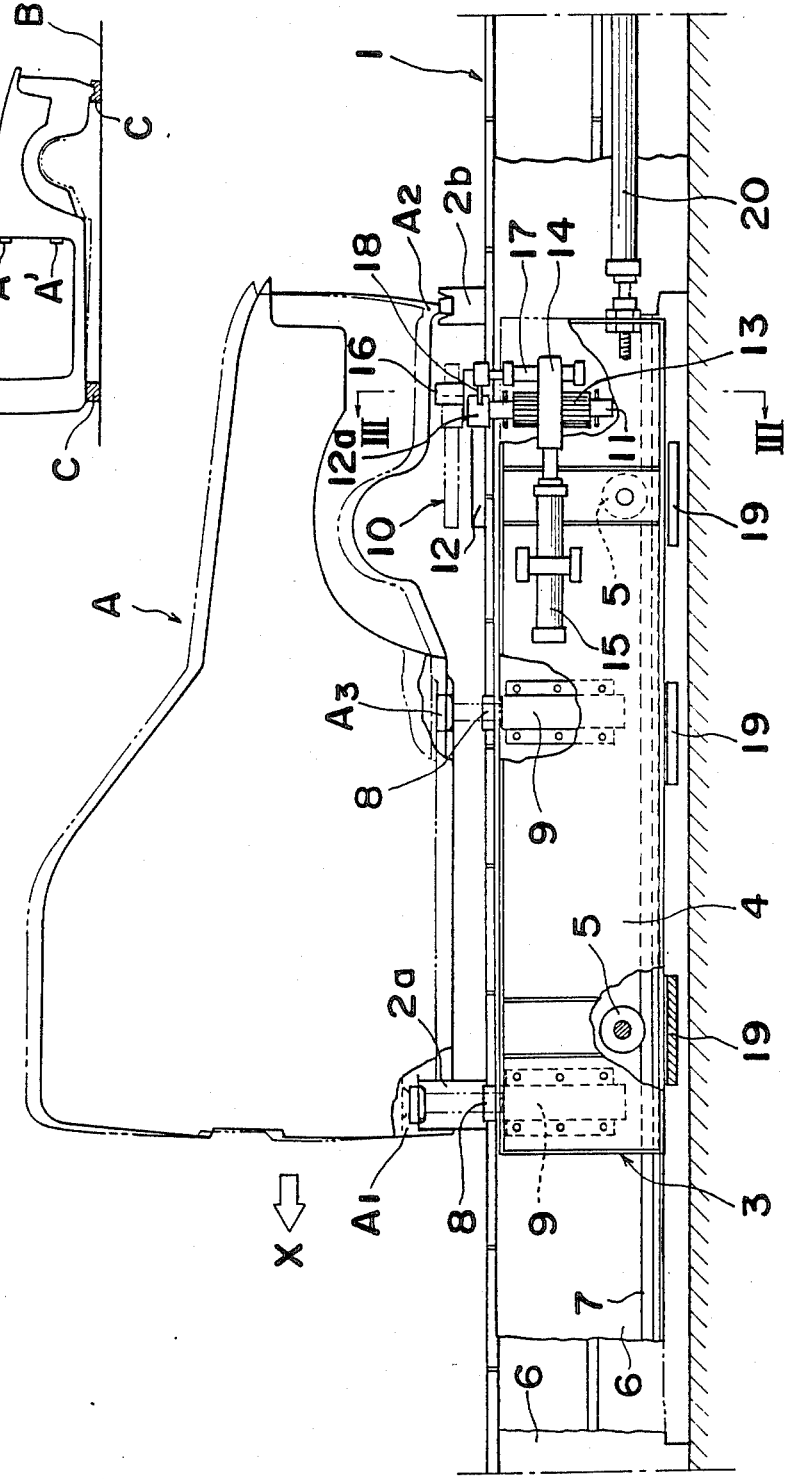
FIG. 2 is a side view, with a portion cut away, of a slat conveyor system embodying the present invention.
Figures 3, 4:
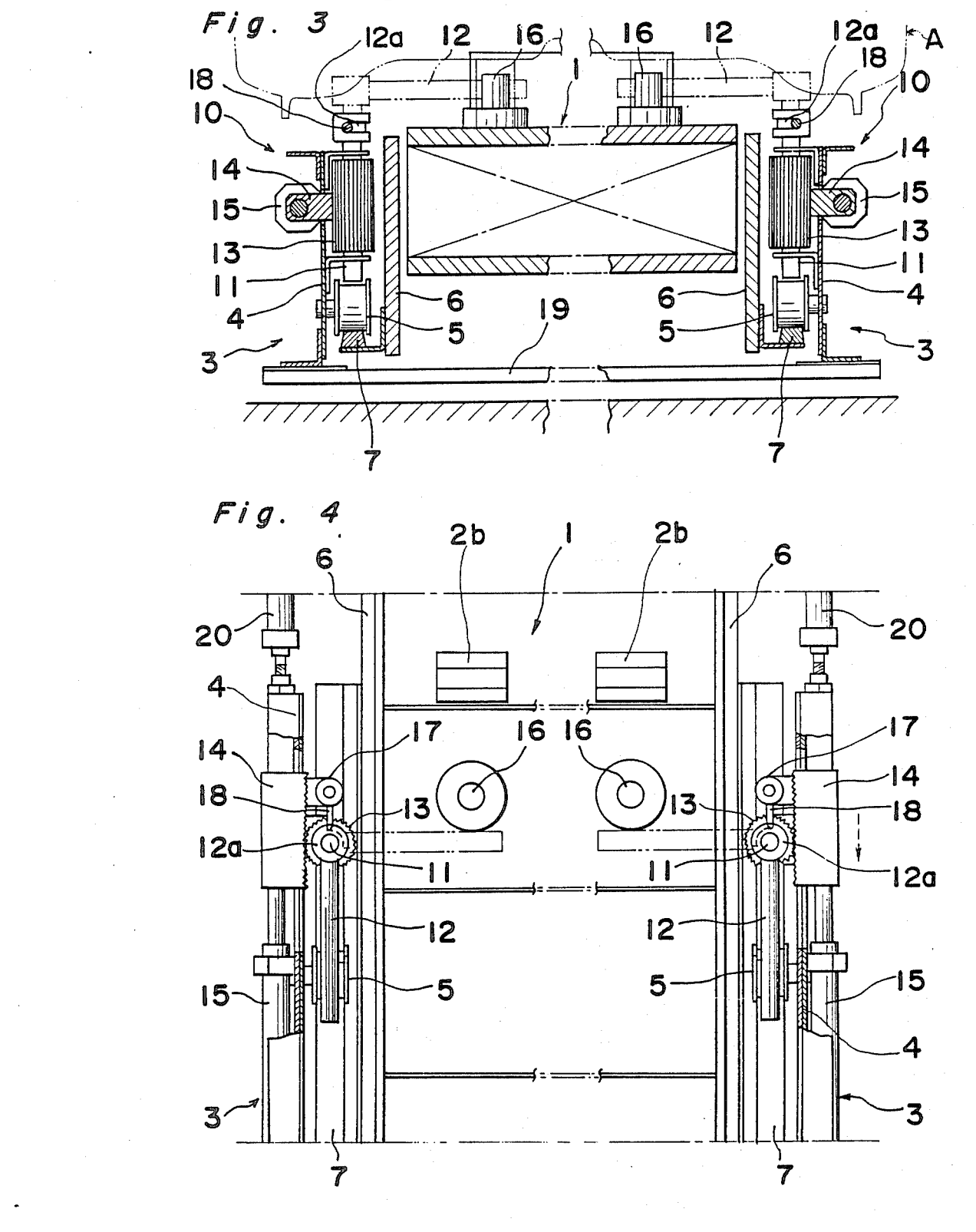

Referring now to FIGS. 2 to 4, the slat conveyor is generally identified by 1 and is driven in any known manner so as to transport each cab structure A in a direction shown by the arrow X. The slat conveyor has a plurality of pillows mounted thereon at regular intervals over the entire length thereof, each of which pillows comprises a pair of shim members 2a and 2b spaced a distance, corresponding to the length of the cab structure A, from each other in a direction lengthwise of the slat conveyor 1. So far shown, each of the leading and trailing shim members 2a and 2b is shown as comprised of separate shim pieces spaced widthwise of the conveyor 1 as best shown in FIG. 4. As is well known to those skilled in the art, the leading shim member 2a is for the support of the rearmost portion A1 of the cab structure A whereas the trailing shim member 2b is for the support of the foremost portion A2 of the same cab structure A, as best shown in FIG. 1.

While the slat conveyor 1 of the construction so far described may be of any known construction, each area of the slat conveyor 1 to be occupied by a respective cab structure A is, however, provided with a pair of generally cylindrical engagement members 16 for the purpose of the present invention. As best shown in FIGS. 3 and 4, the engagement members 16 are rigidly mounted on the slat conveyor 1 on respective sides with respect to the longitudinal center line of the slat conveyor 1 so as to protrude a certain distance upwardly therefrom and positioned in the vicinity of and inwardly of the trailing shim member 2b with respect to the direction towards the leading shim member 2a, the function of said engagement members 16 being described later.

The slat conveyor system according to the present invention comprises generally elongated side carriages 3 one on each side of the slat conveyor 1. Since the carriages 3 are of identical construction and are movable simultaneously with each other and to the accompaniment of the forward run of the slat conveyor 1, between initial and end positions past the door fitting station, reference will now be made to only one of them in describing the details thereof for the sake of brevity.

The side carriage 3 comprises a generally rectangular plate-like frame 4 carrying a plurality of lengthwisely spaced rollers 5 mounted on a guide rail 7 from above so as to roll therealong. Positioned between the frame 4 and the slat conveyor 1 is an elongated bulkhead 6 fixedly mounted at its opposite ends on the factory floor alongside the slat conveyor 1 so as to extend parallel to the slat conveyor, although this bulkhead 6 may be fixedly secured to fixed portions of the slat conveyor 1 other than the moving belt of the slats. The guide rail 7 is rigidly mounted on a lower side edge portion of the bulkhead 6 in any known manner, for example, by means of suitable mounting brackets and, accordingly, the carriage 3 is supported by the bulkhead 6 with the rollers 5 mounted on the guide rail 7 for movement between the initial and end positions.

The carriage 3 includes leading and trailing lift cylinders 9 carried by the frame 4 at a leading end portion and a substantially intermediate portion thereof, respectively, and having respective piston rods extending perpendicular to the longitudinal sense of the carriage 3. A solid pad 8 engageable with the cab structure A from below as will be described later is rigidly mounted on a free end of each of the piston rods of the respective cylinders 9 remote from the body of the associated cylinder 9. The carriage 3 also includes a catch mechanism generally identified by 10 and mounted on the trailing end of the frame 4 opposite to the leading end thereof, which mechanism 10 comprises a catch bar 12 engageably with the associated engagement member 16 on the slat conveyor in a manner as will become clear from the subsequent description.

The catch mechanism 10 includes a shaft 11 journalled at its opposite end portions to the frame 4, so as to extend perpendicular to the frame 4, a pinion gear 13 axially splined to the shaft 11 for rotation together with and also for axial displacement through a predetermined distance relative to the shaft 11, and a drive unit for driving the shaft 11 through the pinion gear 13. The shaft 11 has its opposite ends protruding axially outwardly from the pinion gear 13 in opposite directions away from each other, and one of the opposite ends, i.e., an upper end, of the shaft 11 has the catch bar 12 rigidly connected thereto so as to extend perpendicular to the shaft 11. As will become clear from the subsequent description, the shaft 11 is axially displaceable between raised and lowered positions, and the catch bar 12 is pivotable together with the shaft 11 between disengaged and engaged positions about the longitudinal axis of the shaft 11.

The drive unit for driving the shaft 11 through the pinion gear 13 comprises a main cylinder 15 having a piston rod and rigidly mounted on the frame 4 with the piston rod thereof lying in a direction parallel to the longitudinal sense of the frame 4. The piston rod of the main cylinder 15 has a rack gear 14 mounted thereon for movement together therewith, said rack gear 14 being constantly meshed with the pinion gear 13 whereby the linear motion of the piston rod of the cylinder 15 can be translated into a rotary motion performed by the shaft 11. The drive unit of the construction described hereinabove is so designed that, when the piston rod of the main cylinder 15 retracts in a direction shown by the arrow in FIG. 4, the catch bar 12 can be pivoted together with the shaft 11 from the disengaged position as shown by the solid line in FIGS. 2 and 4 toward the engaged position as shown by the phantom line in FIGS. 3, and 4, but when the same piston rod projects outwardly, the catch bar 12 held in the engaged position can return to the disengaged position. The engagement between the catch bar 12 and the associated engagement member 16 on the slat conveyor 1 takes place when the catch bar 12 is pivoted to the engaged position and the associated engagement member 16 is subsequently brought into contact with the catch bar 12 in the engaged position as a result of the continued forward run of the slat conveyor 1.

In the construction so far described, subsequent to the engagement between the catch bar 12 and the associated engagement member 16 which takes place in the manner as hereinabove described, the movement of the slat conveyor 1 can be transmitted to the carriage 3 to pull the latter in a direction conforming to the direction of movement of the slat conveyor 1 and, accordingly, the carriage 3 is moved from the initial position towards the end position past the door fitting position to the accompaniment of the forward run of the slat conveyor 1. In practice, however, the pivotal movement of the catch bar 12 from the disengaged position towards the engaged position, or the retracting motion of the piston rod of the main cylinder 15, takes place after the shaft 11 has been axially shifted from the lowered position to the raised position.

For axially shifting the shaft 11 from the lowered position as shown by the solid line in FIG. 3 towards the raised position as shown by the phantom line in FIG. 3, the carriage 3 also comprises a sub-cylinder 17 having a piston rod and rigidly secured to the frame 4 with the piston rod thereof extending parallel to the shaft 11, and a connecting rod 18 having one end rigidly coupled with a free end of the piston rod of the sub-cylinder 17 and the other end engaged in an arcuate guide groove 12a defined in the joint between the shaft 11 and the catch bar 12 so as to extend a predetermined angle about the longitudinal axis of the shaft 11, said predetermined angle being about 90° or more, enough to permit the catch bar 12 to move between the disengaged and engaged positions. Thus, it will readily be seen that when the sub-cylinder 17 is actuated to project its piston rod, the connecting rod 18 shifts upwardly as viewed in FIGS. 2 and 3 accompanied by the upward shift of the shaft 11 from the lowered position to the raised position, but when the sub-cylinder 17 is actuated to retract its piston rod, the connecting rod 18 once upwardly shifted decends accompanied by the lowering of the catch bar 12 back to the lowered position.

It is to be noted that the capability of the shaft 11 being axially shifted between the lowered and raised positions, i.e., the sub-cylinder 17 with its associated parts, may not always be necessary if the catch bar 12 is so designed as to pivot between the disengaged and engaged positions in a plane above the upper run of the slat conveyor 1. However, considering that the overall width of the conveyor system as measured from one carriage 3 to the opposite carriage 3 across the conveyor 1 is selected to be smaller than the minimum possible width of the cab structure A of certain model for the purpose of ease in access to the cab structure A from lateral directions, it may happen that the catch bar 12 will provide an obstruction to the passage of the cab structure A being conveyed towards the door fitting station. Accordingly, in the illustrated embodiment, while the catch bar 12 in the disengaged position is permitted to position itself at a level genrally flush with, or alternatively below, the upper run of the slat conveyor, the sub-cylinder 17 is employed to cause the shaft 11, and hence, the catch bar 12 to be upwardly shifted before the catch bar 16 is pivoted from the disengaged position towards the engaged position by the action of the main cylinder 15.

It is also to be noted that the leading and trailing lift cylinders 9 are so spaced a distance as to permit the pads 8 mounted respectively on the piston rods of these cylinders 9 to support the rearmost portion A1 of the cab structure A and a portion A3 generally intermediate between the foremost and rearmost portions A2 and A1 of the same cab structure A, respectively, which portions A1 and A3 correspond to the positions where the cab structure A is riveted to or otherwise connected with the chassis (not shown).

While in the foregoing description only one of the carriages 3 arranged on respective sides of the slat conveyor 1 has been fully described, the other of the carriage 3 is to be understood as of identical construction. Specifically, as can readily be understood from FIGS. 3 and 4, the details of one of the carriages 3 is generally in symmetric relation to those of the other of the carriages 3 with respect to the longitudinal axis of the slat conveyor 1, and the directions of rotation of the shafts 11 for pivoting the associated catch bars 12, respectively, are in opposite relationship with respect to each other.

While each of the carriages 3 is constructed as hereinbefore described, the carriages 3 are connected together by means of one or plurality of connecting members 19 extending underneath the salt conveyor 1 and also underneath the bulkheads 6 on respective sides of the conveyor 1.

Single-acting cylinders 20 supported in any suitable manner above the factory floor have their piston rods coupled with the frames 4 of the carriages 3, respectively. These cylinders 20 are operable to pull the respective carriages 3 from the end position back towards the initial position, while during the movement of the carriages 3 from the initial position towards the end position, the piston rods of these cylinders 20 are free to project therefrom as pulled by the carriages 3. Although the cylinders 20 have been employed one for each carriage, either one of the cylinders 20 may be omitted because of the presence of the connecting members 19 connecting the carriages 3 together.

Hereinafter, the operation of the conveyor system according to the present invention will be described.

Assuming that one of the cab structures A successively conveyed by the slat conveyor approaches the door fitting station, the sub-cylinders 17 are actuated in response to the arrival of the cab structure A to project their piston rods with the shafts 11 consequently shifted from the lowered position towards the raised position. In response to the arrival of the shafts 11 at the raised position, the main cylinders 15 are actuated to cause the catch bars 12 to move from the disengaged position towards the engaged position in the manner as hereinbefore described. When the catch bars 12 have been pivoted to the engaged position, they are held in position to engage the engagement members 16 on the slat conveyor 1, and therefore, as the cab structure A further approaches the door fitting station, the engagement members 16 are brought into abutment with the catch bars 12 in the engaged position. In this way, the carriages 3 are moved from the initial position towards the end position accompanying the continued movement of the slat conveyor 1, by the reasons which have hereinbefore been described, along the respective guide rails 7 with the rollers 5 rolling thereon.

In response to the start of movement of the carriages 3 from the initial position, the lift cylinders 9 are all actuated to project their piston rods to lift the cab structure A to a position shown by the phantom line in FIG. 2 with the pads 8 supporting the portions A1 and A3 of the cab structure A from below. The cab structure A so lifted above the slat conveyor 1 by the piston rods of the lift cylinders 9 represents the shape assumed by the cab structure A as if it were mounted on the chassis, and is maintained in the lifted position during the passage thereof through the door fitting position and before the carriages 3 reach the end position. The door assemblies (not shown) are of course fitted to the cab structure from the opposite direction laterally of the slat conveyor 1 at the door fitting station either by the manual intervention of the attendant workers or by the automatic door fitting assemblies such as disclosed in the previously mentioned Japanese publication.

Since the cab structure A represents the shape assumed thereby when it is mounted on the chassis at the time of door fitting, the door assemblies can be readily and easily aligned with the respective door fitting openings in the cab structure and can be exactly hinged to the cab structure A. Therefore, the necessity of the post-fitting readjustment resulting from the misalignment can be advantageously eliminated.

After the completion of the door fitting job, the lift cylinders 9 are first actuated to retract their piston rods to lower the cab structure A until the foremost and rearmost portions A2 and A1 thereof rest on the shim members 2b and 2a, followed by the actuation of the main cylinders 15 to retract their position rods to permit the catch bars 12 to return to the disengaged position disengaging from the associated engagement members 16. In response to the return of the catch bars 12 to the disengaged position, the subcylinders 17 are actuated to retract their piston rods to bring the shafts 11 back to the lowered position. Simultaneously with the actuation of the sub-cylinders 17 to retract their piston rods or in response to the return of the shafts 11 to the lowered position, the cylinders 20 are actuated to retract their piston rods, accompanied by the pull of the carriages 3 from the end position back to the initial position, thereby completing one cycle of operation for each cab structure.

Although the present invention has been fully described in connection with the preferred embodiment thereof with reference to the accompanying drawings, it is to be noted that various changes and modifications are apparent to those skilled in the art. By way of example, although in the foregoing description the pinion gears 13 have been described as axially splined to the respective shafts 11, they may be rigidly mounted on or otherwise integrally formed with the respective shafts 11. In this case, it is necessary for the catch bars 12 to be coupled with the respective shafts 11 for rotation together therewith and also for axial movement relative to the respective shafts 11 through a distance corresponding to the stroke of movement of the piston rod of each sub-cylinder 17.

Moreover, instead of the employment of the two engagement members 16 for each cab structure, the single engagement member may be employed if it has a size enough to permit the catch bars 12 to be brought into contact therewith.

Accordingly, such changes and modifications are to be understood as included within the scope of the present invention as defined by the appended claims unless they depart therefrom.

What is claimed is:

1. A conveyor system in an automobile assembly line which comprises, in combination:

a slat conveyor for conveying a vehicle body structure from one position towards another position past a door fitting position at which at least one door assembly is fitted to the body structure being conveyed, said slat conveyor having at least one engagement member movable together therewith;

a pair of side carriages arranged on respective sides of the slat conveyor for movement between initial and end positions along the slat conveyor, each of said carriages comprising a clutch mechanism including a catch bar supported for movement between a disengaged position, at which the catch bar is clear from the path of movement of the engagement member on the slat conveyor, and an engaged position at which the engagement member can be brought into engagement with the catch bar for transmitting the movement of the slat conveyor to the carriage to move the latter from the initial position towards the end position in unison with the movement of the slat conveyor, and a plurality of lift cylinders operable to lift the body structure a predetermined height above the slat conveyor during the passage of the body structure being conveyed through the door fitting station; and a cylinder means for forcibly returning the carriages, once moved to the end position to the accompaniment of the movement of the slat conveyor, and the catch bars in said disengaged position to the initial position.

2. The system as claimed in claim 1, wherein the catch mechanism for each carriage comprises a main cylinder having a piston rod movable between projected and retracted positions, a shaft member having one end on which the catch bar is mounted for rotation together therewith, and a motion translator for translating the movement of the piston rod into a rotary motion assumed by the shaft member, whereby when the piston rod is moved between the projected and retracted position, said catch bar is pivoted between the disengaged and engaged positions together with the shaft member.

3. The system as claimed in claim 2, wherein the motion translator comprises a rack gear mounted on the piston rod of the main cylinder and a pinion gear mounted on the shaft member and constantly meshed with the rack gear.

4. The system as claimed in claim 1, further comprising means for shifting the catch bar between raised and lifted positions, said shifting means being operable when the catch bar is in the disengaged position.

5. The system as claimed in claim 1, wherein the body structure is a truck cab structure.

* * * * *